(12) United States Patent
Popov

(10) Patent No.: US 9,824,109 B2
(45) Date of Patent: Nov. 21, 2017

(54) METHODS AND SYSTEMS FOR INDEXING REFERENCES TO DOCUMENTS OF A DATABASE AND FOR LOCATING DOCUMENTS IN THE DATABASE

(71) Applicant: YANDEX EUROPE AG, Lucerne (CH)

(72) Inventor: Petr Sergeevich Popov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 14/936,859

(22) Filed: Nov. 10, 2015

(65) Prior Publication Data
US 2016/0063046 A1    Mar. 3, 2016

Related U.S. Application Data

(63) Continuation of application No. PCT/IB2014/065215, filed on Oct. 10, 2014.

(30) Foreign Application Priority Data

Oct. 10, 2013  (RU) .............................. 2013145298

(51) Int. Cl.
*G06F 7/00* (2006.01)
*G06F 17/00* (2006.01)
*G06F 17/30* (2006.01)

(52) U.S. Cl.
CPC .. *G06F 17/30336* (2013.01); *G06F 17/30011* (2013.01); *G06F 17/3033* (2013.01); *G06F 17/30339* (2013.01); *G06F 17/30619* (2013.01); *G06F 17/30622* (2013.01)

(58) Field of Classification Search
CPC .............................................. G06F 17/30619
USPC ......................................................... 707/693
See application file for complete search history.

(56) References Cited

U.S. PATENT DOCUMENTS

| | | |
|---|---|---|
| 5,953,723 A | 9/1999 | Linoff et al. |
| 6,249,782 B1 | 6/2001 | Day et al. |
| 6,430,565 B1 | 8/2002 | Berger et al. |
| 7,630,319 B1 | 12/2009 | Studtmann |

(Continued)

OTHER PUBLICATIONS

International Search Report for PCT/IB2014/065215; Mar. 13, 2015; Lee W. Young.
U.S. Appl. No. 14/829,665, filed Aug. 19, 2015.
U.S. Appl. No. 14/936,859, filed Nov. 10, 2015.
U.S. Appl. No. 14/936,880, filed Nov. 10, 2015.

(Continued)

*Primary Examiner* — Van Oberly
(74) *Attorney, Agent, or Firm* — BCF LLP

(57) ABSTRACT

Methods and systems allow indexing references to documents of a database according to database reference profiles. Documents may then be located in the database using decoding protocols based on the database reference profiles. To this end, the documents are stored in the database and searchable terms extracted therefrom are associated with posting lists. Each posting list is divided into blocks of M database references. The blocks are encoded according to a pattern that depends on the M database references. A corresponding pointer to a table of encoding patterns is appended to each block. When a query is received for a searchable term, blocks are extracted from a posting list corresponding to the searchable term and a pointer for each block is used to extract a decoding protocol related to an encoding pattern for the block.

17 Claims, 18 Drawing Sheets

(56) References Cited

U.S. PATENT DOCUMENTS

| | | | |
|---|---|---|---|
| 8,996,531 B1 | 3/2015 | Sacco | |
| 2008/0154938 A1* | 6/2008 | Cheslow | G06F 17/30613 |
| 2009/0164437 A1 | 6/2009 | Torbjornsen | |
| 2009/0313238 A1 | 12/2009 | Merrigan et al. | |
| 2010/0198829 A1 | 8/2010 | Elzinga | |
| 2010/0281004 A1 | 11/2010 | Kapoor et al. | |
| 2011/0066623 A1 | 3/2011 | Weissman | |
| 2011/0106813 A1 | 5/2011 | Jensen et al. | |
| 2011/0161617 A1* | 6/2011 | Bamba | G06F 9/5016 |
| | | | 711/170 |
| 2012/0130996 A1 | 5/2012 | Risvik et al. | |
| 2012/0173504 A1 | 7/2012 | Moraleda | |
| 2012/0221540 A1 | 8/2012 | Rose et al. | |
| 2012/0323927 A1 | 12/2012 | Froemmgen | |
| 2013/0103693 A1 | 4/2013 | Arikuma et al. | |

OTHER PUBLICATIONS

European Search Report from EP14852162.8 dated Sep. 30, 2016 Frank, Korbinian.
Naiyong Ao et al., "Efficient Parallel Lists Intersection and Index Compression Algorithms Using Graphics Processing Units", Proceedings of the VLDB Endowment, vol. 4, No. 8, Aug. 29-Sep. 3, 2011, pp. 470-481, KP055305632, New York, NY.
Delbru et al., "Adaptive Frame of Reference for Compressinf Inverted Lists", DERI Technical Report, Dec. 16, 2010 , DERI—Digital Enterprise Research Institute, XP055305627, Galway, Retrieved from the Internet: URL:http://www.renaud.delbru/fr/doc/pub/deri2010-afor.pdf, [retrieved on Sep. 26, 2016].

* cited by examiner

| Term | First document reference (1st delta) | Second document reference (2nd delta) | Third document reference (3rd delta) | Fourth document reference (4th delta) | Fifth document reference (5th delta) |
|---|---|---|---|---|---|
| Dog | 25 (25) | 35 (10) | 47 (12) | 65 (18) | 83 (18) |
| Horse | 8 (8) | 20 (12) | 25 (5) | 45 (20) | 52 (7) |
| Lama | 19 (19) | 60 (41) | 80 (20) | 97 (17) | - |
| Hyena | 27 (27) | 61 (34) | 91 (30) | - | - |
| Armadillo | 27 (27) | 74 (47) | - | - | - |

Figure 1 (PRIOR ART)

| | e0 | e1 | e2 | e3 | e4 | e5 | e6 | e7 |
|---|---|---|---|---|---|---|---|---|
| Body | 11 | 10 | 00 | 01 | 00 | 01 | 01 | 10 |
| Patches | 0 | 0 | 1 | 0 | 0 | 0 | 1 | 0 |
| | | | $p_1=2$ $v_1=1$ | | | | $p_2=6$ $v_2=1$ | |

Figure 4 (PRIOR ART)

METHODS AND SYSTEMS FOR INDEXING REFERENCES TO DOCUMENTS OF A DATABASE AND FOR LOCATING DOCUMENTS IN THE DATABASE

CROSS-REFERENCE

The present application claims priority to Russian Patent Application No. 20131452598, filed Oct. 10, 2013, entitled "METHODS AND SYSTEMS FOR INDEXING REFERENCES TO DOCUMENTS OF A DATABASE ACCORDING TO DATABASE REFERENCE PROFILES AND FOR LOCATING DOCUMENTS IN THE DATABASE USING DECODING PROTOCOLS BASED ON THE DATABASE REFERENCE PROFILES" and is a continuation of International Application No. PCT/IB2014/065215 filed on Oct. 10, 2014, entitled "METHODS AND SYSTEMS FOR INDEXING REFERENCES TO DOCUMENTS OF A DATABASE AND FOR LOCATING DOCUMENTS IN THE DATABASE", the entirety of both of which are incorporated herein by reference.

FIELD

The present invention relates to the field of large databases and, more particularly, to methods and systems for indexing references to documents of a database according to database reference profiles and for locating documents in the database using decoding protocols based on the database reference profiles.

BACKGROUND

Today's large data centers manage collections of data comprising billions of data items. In large collections like these, searching for particular items that meet conditions of a given search query is a task that can take noticeable time and consume a considerable amount of resources. Query response time can be critical in many applications, either due to specific technical requirements, or because of high expectations from users. Therefore, various solutions have been proposed for reducing search query execution times.

Typically, to build a search-efficient data collection management system, data items are indexed according to some or all of the possible query terms. A so-called inverted index of the data collection is maintained and updated by the system, to be then used in execution of every search query. The inverted index comprises a large set of posting lists, where every posting list corresponds to a search term and contains references to data items comprising that search term, or satisfying some condition that is expressed by the search term.

Using as a first example a Web search engine, data items may take the form of text documents and search terms may be individual words or some of their most often used combinations. The inverted index then comprises one posting list per every word present in at least some of the documents. In a second example, a data collection may be a database comprising one or more very long tables, in which data items are individual records, for example lines in a table, having a number of attributes represented by some values in appropriate columns. In this second example, search terms are specific attribute values, or other conditions on attributes and the posting list for a search term is a list of references (indexes, ordinal numbers) to records that satisfy the search term.

FIG. 1 is a simplified illustration of an inverted index in tabular form. A tabular inverted index 2 shown on FIG. 1 is much smaller than those of typical applications, the inverted index 2 is thus greatly simplified for illustration purposes. The tabular index 2 may be applied to both examples of a Web search engine and of a data collection of a database. The tabular inverted index 2 corresponds to 100 documents (not shown) stored in a database (not shown), the documents being numbered from 1 to 100. As shown, the tabular inverted index 2 comprises a header row 4 that defines elements of various columns 16, 18, 20, 22, 24 and 26. The header row 4 may not be present in some actual realizations and is shown on FIG. 1 for illustration purposes. Other rows 6, 8, 10, 12 and 14 each comprise a term in column 16, and a corresponding posting list in columns 18, 20, 22, 24 and 26. In the particular example of FIG. 1, terms of rows 6, 8, 10, 12 and 14 are names of animals that are mentioned in several of the 100 documents of the database. Each posting list comprises a first document reference in column 18 and may comprise additional document references in columns 20-26. Considering for example row 6, the term "dog" is found in documents number 25, 35, 47, 65 and 83 of the database. The first document reference placed in row 6, column 18, may be an absolute document number (25) or a first delta reference indicating a difference between the absolute document number and a $0^{th}$ document number, this first delta reference being equal to the absolute document number. A second document reference is placed in row 6, column 20. The second document reference may be stored as an absolute document number (35). Alternatively, the second document number may be stored as a second delta reference, indicating a difference (10) between the second document number (35) and the first document number (25); to use delta references, document reference numbers are stored in the posting lists in ascending order. Likewise, a number of a third document comprising the term "dog" may be stored as an absolute document number (47) or as a third delta (12) between the third document number (47) and the second document number (35).

Using delta references requires less memory space for storing the tabular inverted index 2 since, on average, data elements of the tabular inverted index 2 are smaller and can be encoded with fewer bits. Because a difference between two absolute document numbers will always be at least equal to one (1) or greater, additional space may be saved by recalculating delta references as differences between absolute document numbers minus one (1). Using this manner of calculating delta references, all numbers between parentheses of the inverted index 2 would be decremented by one (1). For example, the first delta reference on row 8, for the term "horse", would be decremented from "8", which requires four (4) bits for encoding, to "7", which can be encoded with only three (3) bits.

The illustrated tabular inverted index 2 provides references for five (5) distinct animal names that may be searched among the 100 documents of the database. Accordingly, the highest document reference number does not exceed 100. It may be observed that a distinct terms may be found in the same document, for example "dog" and "horse" being both found in document number 25, and that terms that refer to rare animals are found in fewer documents.

FIG. 2 is a simplified illustration of an inverted index in single vector form. Information elements of the tabular inverted index 2 of FIG. 1 are reproduced in a single vector inverted index 30 of FIG. 2; some additional elements have been added for illustration purposes. The single vector inverted index 30 is built in a similar fashion as the tabular inverted index 2 of FIG. 1, except that terms and corresponding posting lists are placed on a continuous vector, a second term (horse) following a posting list for a first term (dog) so that no position needs to remain empty, as in the case for example of the last few columns of rows 10-14 of FIG. 1.

A query of documents that contain a particular term may be executed by first finding that particular term in the inverted index 2 or 30 and by fetching the relevant documents using the corresponding posting list. To speed up execution of search queries, the inverted index is typically stored in a fast memory, for example in Random Access Memory (RAM) of one or more computer systems. Documents or other data items themselves may be stored on a larger but slower storage media, for example on magnetic or optical disks or other similar large capacity devices. In this way, processing of a search query implies looking up through one or more posting lists of the inverted index in the faster memory, rather than through the data items themselves.

Typically, documents or other data items of a searchable information base are listed in the inverted index as integer reference numbers. For some applications, a range of document numbers may be in a range from one billion to several billions. Some words that may be used as search terms may be located in very large numbers of documents, for example in millions of documents. Consequently, an inverted index may comprise millions of searchable terms, each of these terms being associated with a potentially long posting list. It follows that there is a need, in various computer applications, to represent very long lists of symbols or codewords, for example document reference numbers, in compressed form and to store these long lists in fast computer memory for efficient access and processing.

In many applications, storing of documents in a database and updating of an inverted index is performed as a background application. This may for example be the case of so-called Webcrawler applications that automatically browse through the Word Wide Web to accumulate information into a database of a Web search engine. For these applications, speed is of secondary importance while effectiveness of compression of information in the inverted index is more important. In contrast, decompression speed is more important since a user of a Web search engine or of a database system may require fast response to her search queries.

It can be seen from FIG. 1 and from FIG. 2 that terms that may be found in a large number of documents are associated with long posting lists that, in turn, contain small reference numbers (small integers) when delta references are used. A posting list of small integers may be subdivided into short blocks, these blocks then being compressed for compact storage of the inverted index in memory. Ideally, all elements in a short block would be of a same length in the sense that they would be coded with a same number of bits. Use of same-length coding of elements in a block allows using computer systems having low parallelism levels, as in the case of single instruction multiple data (SIMD) processors. For example, if the processor has a subset of SIMD instructions capable of being performed on eight (8) different data elements in parallel, it would be beneficial to represent every long list of symbols as a sequence of blocks, where every block contains or represents exactly eight (8) symbols. In fact, some processors are capable of executing SIMD instructions on as many as 32 or even 128 data elements in parallel; blocks or 32 or 128 consecutive integers, representing reference numbers (or delta reference numbers) could be efficiently handled by such processors as long as their 32 or 128 elements are of equal lengths.

However, coding all elements of a block in a same number of bits may be inefficient in terms of compression. For example, seven (7) elements of a block might be codable on three (3) bits while another element of the block may require five (5) bits for coding. Coding all eight (8) elements of the block on five (5) bits each would not attain an optimal level of compression. A list coding method called "Patched Frame of Reference" (PFor) proposes to code smaller elements of a block on their optimal number of bits (in the current example, on 3 bits each), while moving out the larger element(s) into a separate list of exceptions, called "patches", which are coded on more bits. Every patch position in a "main" block is filled with a number of a next patch position relative to this one, thus making up a chained list of patch jumps across the block. A block header contains a first patch position number relative to the beginning of the block, as well as a number of bits used for every smaller element bits (3 bits in the current example) placed in their original position in the block and the number of bits (2 bits in the current example) for every "patched" larger element.

It has been found that PFor works reasonably well for medium-sized blocks, for example for blocks of length 128 elements. However, PFor does not provide for sufficient parallelism in list decoding, because the chained list of relative patch jumps must still be retrieved sequentially, and converted into absolute patch positions within the block. Also, there may be cases when a relative jump from one patch position to the next one is too long for being coded "inline" in as many bits as used for every inline element of the block. In those cases, a fake patch position must be introduced, to split the jump into two shorter ones.

According to a modified PFor method called "NewPForDelta" (NewPFD), the least significant bits of the appropriate patch value (3 least significant bits in the above example) stands in every patch position while the remaining bits are coded apart (2 remaining bits in the above example). The whole representation of a block thus consists of three (3) lists appended to each other, including (i) a main list comprising smaller elements along with least significant bits of larger elements in patch positions, (ii) a list of the remaining portions of the larger elements, and (iii) a chained list of jumps from one patch position to another.

The NewPFD method, however, still does not provide for sufficient parallelism in list decoding. Hence, a further modification of the PFor method called "Parallel PFor" (ParaPFor) replaces the chained list of relative positions of patches with their absolute position numbers relative to the beginning of the block. For example, in a 32-element block, every patch position has a number from 0 to 31 and thus coded on five (5) bits. This list of patch positions can be unpacked in a few parallel SIMD threads, at the same time as the main list and the list of higher bits of the patches. Finally, a parallel element-wise add operation can be performed, yielding the whole unpacked block.

The ParaPFor method may be demonstrated with the following example: Let us consider an 8-element block [3,2,4,1,0,1,5,2], each element representing for example a delta reference in a posting list. In binary representation, the block becomes [11,10,100,1,0,1,101,10]. Elements are numbered from e0 to e7, from left to right. The block has three (3) elements of 1-bit length ($3^{rd}$, $4^{th}$ and $5^{th}$ elements), three (3) elements of 2-bits length ($0^{th}$, $1^{st}$ and $7^{th}$ elements) and 2 elements of 3-bits length ($2^{nd}$ and the $6^{th}$ elements).

FIG. 3 shows a data structure of an uncompressed posting list block. A block is composed of blocks of eight (8)

elements each. The above mentioned block is the block number f in the posting list; its content is schematically shown at 40. A length of an element of the block f denotes a number of bits minimally necessary for its binary representation; such a shortest representation of an integer may be called its "canonical representation". When an integer is coded on a greater number of bits than is necessary for its canonical representation, it is padded with non-significant binary 0's in the high (left) positions. Block f comprises a header byte 42 and three (3) data bytes 44, 46 and 48. The header byte 42 shows that all elements of the block f are coded with a length l of three (3) bits. This length is sufficient to code the longest elements e2 and e6 of the block f; other elements of the block f carry non-significant padding bits. FIG. 3 therefore shows a "non-patched" encoding of the block f. Because the length l is equal to three (3) bits and because the block f comprises eight (8) elements, a total length of the block f in is equal to four (4) bytes, i.e. l+1 expressed in bytes.

Continuing with the ParaPFor method, a method defines a base length b, in number of bits, of shorter, or "inline" elements. Elements that cannot be encoded within b bits become truncated values that are also placed inline in the compressed block. The method also defines exceptions, or patches, for elements of the block that are longer than b bits. A modified header for the block specifies the base length b and positions of patches ("patch positions" $p_1$, $p_2$), on three (3) bits each. Higher bits of values of every exception ("patch values" $v_1$, $v_2$), representing a difference between the actual values of the uncompressed blocks and truncated values of the compressed block, are separately encoded, before or after the inline element values.

FIG. 4 shows a definition of patches for the posting list block of FIG. 3. The block f of FIG. 3 is schematically represented as 50 comprising in a body row 52, a row 54 of patch values and a row 56 of patch indicia. A base length b is equal to two (2) bits and a body of the block f consists of the two (2) inline bits of every element, in which elements e2 and e6 are truncated. Values of patches on row 52 are either "0" in no-patch positions and "1" in patch positions. It is observed that in the particular example shown herein, patch values are limited to a maximum of one (1) since no value requires more than three (3) bits for encoding and the base length b is equal to two (2) bits. Row 56 indicates that there are two (2) patches in positions $p_i$ equal to 2 and 6 and that their values $v_i$ are both equal to one (1).

FIG. 5 shows a conventional manner of encoding the posting list block of FIG. 3 with the patch definitions of FIG. 4. The block f is now compressed as shown at 60. Using ParaPFor encoding, a header 62 of the block f specifies a total number n of patches, varying for example from 0 (no patches) to 2 or 3 patches. The header 62 also contains a length d of every patch value in the block; it may be assumed that all patches have the same length d, which is a length of the longest patch value. The header 62 then contains patch positions $p_1$, $p_2$, . . . and patch values $v_1$, $v_2$ . . . for the n patches. Inline values e0-e7, including truncated values where applicable, are appended in the compressed block f 60 after the header. If any given field is not sufficiently large to fill a position of the compressed block f 60, that field is passed with non-significant zero bits; this is applicable to header values and to inline values.

The ParaPFor method provides for just slightly lesser compression than the original PFor or the NewPFD, but gains in higher decompression speed on a specialized processor architecture with an appropriate SIMD parallelism factor, such as for example with 32-thread parallelism that can be efficiently used on the NVIDIA™ GTX480 graphical processor. ParaPFor and can thus be considered as offering a reasonably good tradeoff between compression factor and decompression speed on such computer systems. There exist however a large family of general use processors, commonly denoted as the "x86 family", comprising devices from Intel™, AMD™ a few other manufacturers that are widely used in various computer server architectures including very powerful multiprocessor servers. Modern processors of the x86 family are equipped with the so-called "Streaming SIMD Extensions" (SSE) set of instructions, providing for parallel execution of same operations on a bank of 8 "short integer" 16-bit registers. This makes it possible to achieve an 8-thread SIMD parallelism on every processor in a server.

For such an 8-thread SIMD architecture, however, the PFor compression method or its known enhancements including ParaPFor do not provide for an optimal balance between compression density and decompression speed ratio. This is because in a block as short as 8 elements, explicit indication of every patch position becomes inefficient in terms of compression ratio, as compared with a simple enumeration of patch position combinations. Also, repetitive operations of extracting one or more patch position numbers from a block header take time and are processor intensive.

Hence it would be beneficial to have a list compression method providing for yet further improvements both in terms of compression density and of decompression speed. Such improvements would be particularly valuable when using computer architectures with 8-thread SIMD extensions, or in other similar configurations.

In a more general context, any further progress in terms of denser compression and faster decompression of long lists would indeed be beneficial, and every new list compression scheme providing a substantial gain in at least one of the above parameters without introducing a substantial loss in the other one would be beneficial.

BRIEF DESCRIPTION OF THE DRAWINGS

For a better understanding of the present invention, as well as other aspects and further features thereof, reference is made to the following description which is to be used in conjunction with the accompanying drawings, where:

FIG. 1 is a simplified illustration of a posting list in tabular form;

FIG. 4 shows a definition of patches for the posting list block of FIG. 3;

DETAILED DESCRIPTION

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects and advantages of embodiments of the present invention will become apparent from the following description, the accompanying drawings and the appended claims.

Storing and Indexing of Documents in a Database

Figure 6:
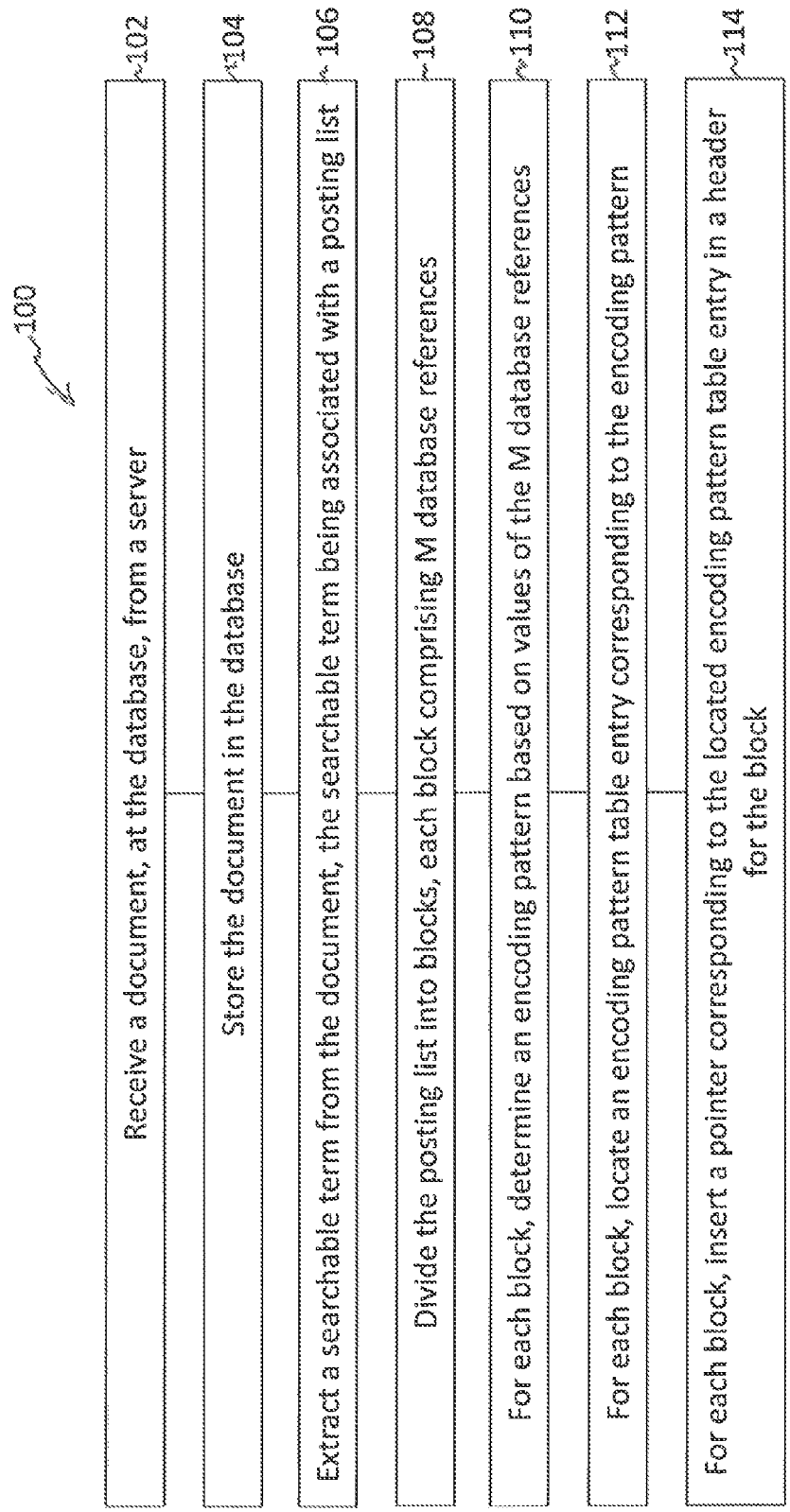
FIG. 6 is a flow chart showing operations of a method of indexing references to documents of a database according to an embodiment.

FIG. 6 is a flow chart showing operations of a method of indexing references to documents of a database according to an embodiment. A sequence 100 comprises a plurality of operations, some of which may be executed in variable order, at least some of the operations possibly being executed concurrently. The sequence 100 involves determining a profile of a block. A block profile is based on a number of bits required for encoding elements of the block, including a number of bits sufficient to encode most of the elements of the block. The block profile includes a numbering exceptions and a manner of encoding the exceptions. The sequence 100 determines an encoding pattern for the block, based on its profile. The sequence 100 comprises an operation 102 of receiving a document, at the database, from a server. The document is stored in the database at operation 104. At operation 106, a searchable term associated with a posting list is extracted from the document. The posting list, which comprises one or more database references to documents that contain the searchable term, is divided into blocks at operation 108, each block comprising M database references. The number M may be any practical integer value, for example any non-zero positive integer multiple of eight (8). The following three (3) operations are executed or each block. At operation 110, an encoding pattern is determined based on values of the M database references. An encoding pattern table entry corresponding to the encoding pattern is located at operation 112. A pointer corresponding to the located encoding pattern table entry is inserted in a header for the block at operation 114.

In the sequence 100, a received document may have previously been stored in the database, in the same version of in a different version. Consequently, the operation 104 of storing the document in the database may comprise any one of adding the document to the database, updating the document in the database, overwriting the document in the database or modifying the document in the database. Storing of the documents in the database may be performed in any conventional manner and does not necessarily depend on searchable terms that they may contain.

Figure 2:
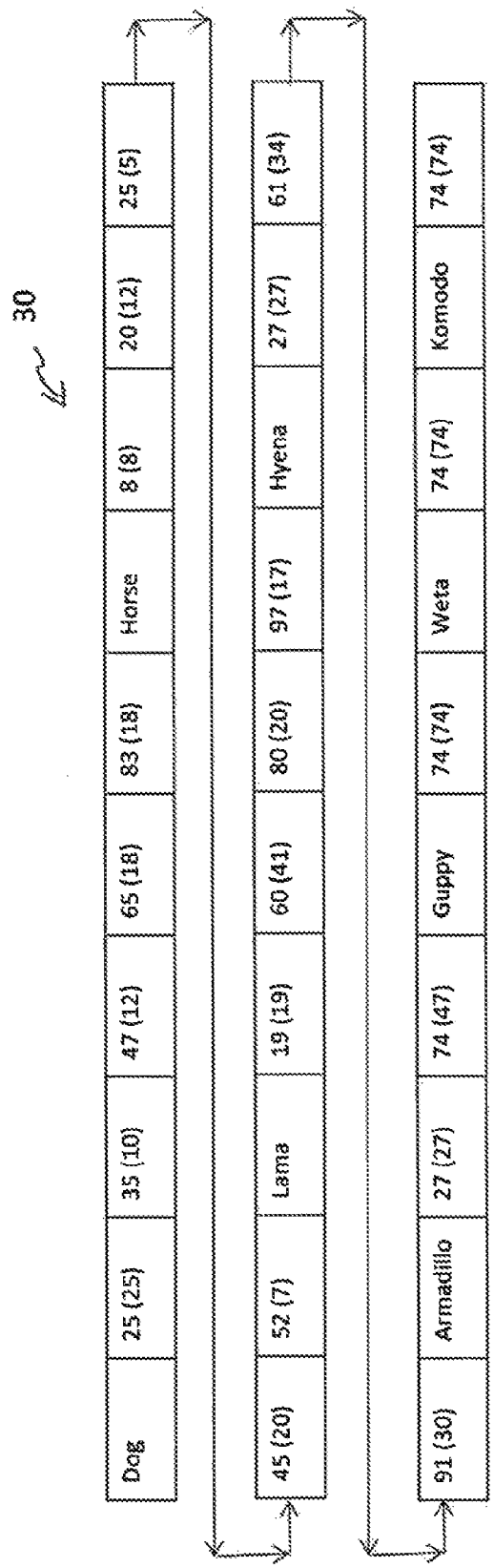
FIG. 2 is a simplified illustration of a posting list in single vector form.

The database may store a plurality of posting lists corresponding to a plurality of searchable terms, the plurality of posting lists forming an inverted index of the database, as introduced in the foregoing descriptions of FIG. 1 and of FIG. 2. The inverted index may thus form a two-dimensional table in which the plurality of searchable terms are in a first dimension and posting lists corresponding to each of the plurality of searchable terms are in a second dimension. Alternatively, the inverted index may form a continuous vector in which a first given searchable term is followed by a corresponding posting list while the posting list corresponding to the first given searchable term is followed by a next searchable term.

At operation 114, the pointer corresponding to the located encoding pattern table entry may be inserted in a single-byte header for the block. In a variant, the header may comprise one or more bytes. A predefined value of a first header byte may indicate whether or not a second header byte is present. Two bytes of a two-byte header then comprise the predefined value and the pointer corresponding to the located encoding pattern table entry. This predefined value may for example take the form of a flag indicating the presence of the second header byte. The predefined value may simply be a value within a predefined range for the first header byte.

Referring at once to FIG. 1, FIG. 2 and FIG. 6, one or more variants of the posting list may designate monotonously increasing document numbers in the database, in which a first database reference in the posting list is a document number of a first document and a next database reference in the posting list is a delta reference based on a difference between the first document number and a document number of a next document. Thereafter, a suite of successive database references in the posting list may comprise a suite of delta references. A given delta reference may be calculated to be equal to a document number of a given document minus a document number of a preceding document. However, as long as the posting list designates monotonously increasing document numbers in the database, a delta reference calculated as a simple difference between a document number of a given document minus a document number of a preceding document would always be at least equal to one (1), or greater. Knowing this, a variant may calculate a given delta reference to be equal to a document number of a given document minus a document number of a preceding document minus one (1). Of course, a compression method using this method of calculating the delta reference will be associated with a decompression method that also uses this calculation method. This solution saves one (1) bit of every delta reference.

Figure 7:
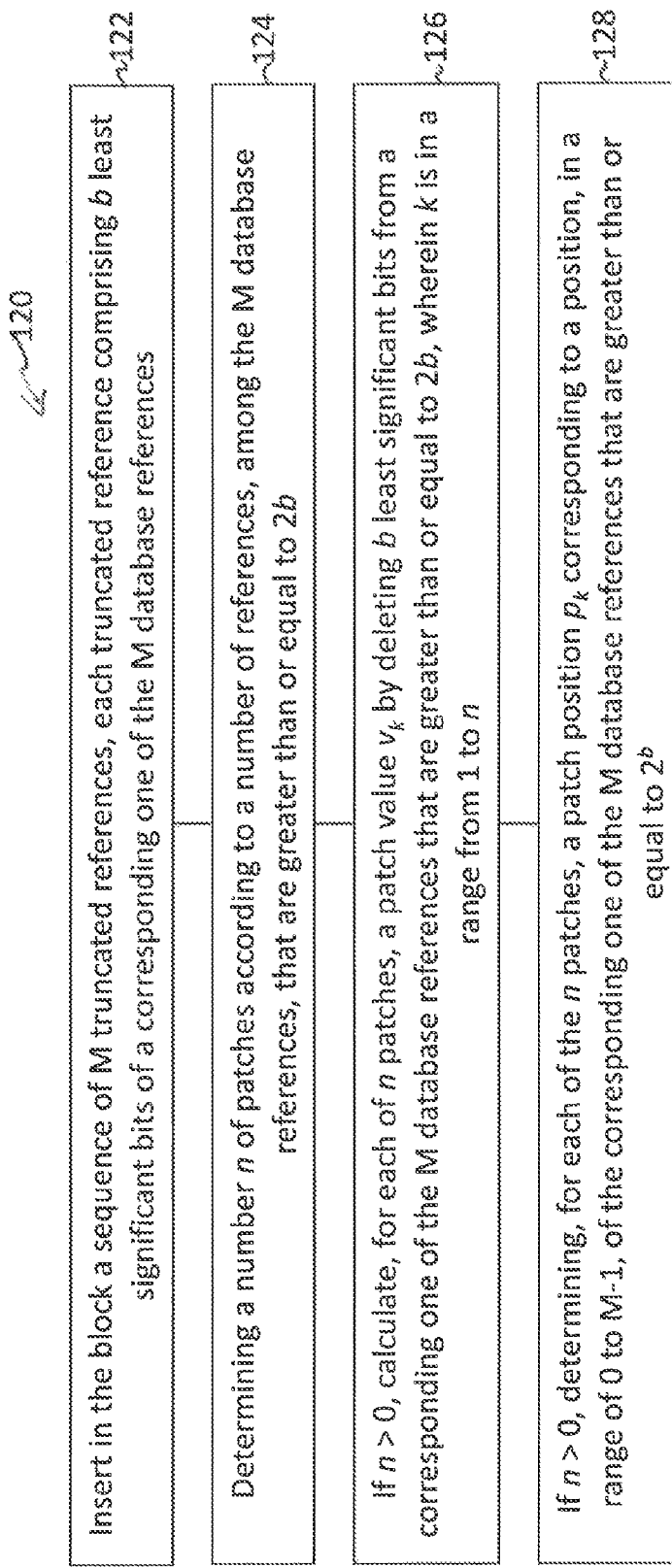
FIG. 7 is a flow chart of operations for determining an encoding pattern for a block according to a variant of the embodiment of FIG. 6.

Determination of the encoding pattern, at operation 110, may be made in various manners. FIG. 7 is a flow chart of operations for determining an encoding pattern for a block according to a variant of the embodiment of FIG. 6. A sequence 120 comprises a plurality of operations, some of which may be executed in variable order, at least some of the operations possibly being executed concurrently. In the sequence 120, a sequence of M truncated references is first inserted in the block at operation 122, each truncated reference comprising b least significant bits of a corresponding one of the M database references. In order to determine the encoding pattern, a number n of patches is determined at operation 124 according to a number of references, among the M database references, that are greater than or equal to 2 b. A constant value of b, common to many blocks, may be used in some applications. In other applications, a value of b may be independently selected for each block. In particular, the value of b for a given block may be selected so that n is not greater than a desired value, for example not greater than two (2) patches. Selecting the value of b according to a largest of the M database references of a given block ensures that n remains equal to zero (0).

If n>0, a patch value $v_k$ is calculated at operation 126, for each of n patches, by deleting b least significant bits from a corresponding one of the M database references that are greater than or equal to 2 b, wherein k is in a range from 1 to n. Still if n>0, a patch position $p_k$ corresponding to a position, in a range of 0 to M−1, of the corresponding one of the M database references that are greater than or equal to 2 b is determined at operation 128 for each of the n patches. From values defined in operations 122, 124, 126 and 128, the encoding pattern is defined as a combination of descriptors comprising b, n, $p_1 \ldots p_n$, $v_1 \ldots v_n$. For a given block, a value of b may be the same for all elements contained in the block. In such a case, the block comprises no patch and n is equal to zero (0). The encoding pattern for this block then comprises b, n.

It should be noted that variants of the encoding pattern may combine the various descriptors b, n, $p_1 \ldots p_n$, $v_1 \ldots v_n$ listed in any particular order.

A number of variants may be contemplated to modify the sequence 120 according to the needs of a particular application. For some applications, for example for some processor configurations, the number M may be set to equal to 4 and the value of b may be selected so that n is equal to 0 or to 1. In other applications, a patch length d may be calculated, for each block as a length, in bits, of a largest one of the n patches. In such applications, the encoding pattern may be defined as a combination comprising b, n, d, $p_1 \ldots p_n$, $v_1 \ldots v_n$.

As mentioned earlier, an encoding pattern table entry corresponding to the encoding pattern is located at operation 112 and a pointer corresponding to the located encoding pattern table entry is inserted in a header for the block at operation 114. The header may thus comprise a simple pointer to the encoding pattern table. However, in a variant, the header may further comprise an explicit value for at least one of the descriptors b, n, $p_1 \ldots p_n$, $v_1 \ldots v_n$. Without limitation, such an explicit value may be inserted in a second byte of a two-byte header.

Figure 3:
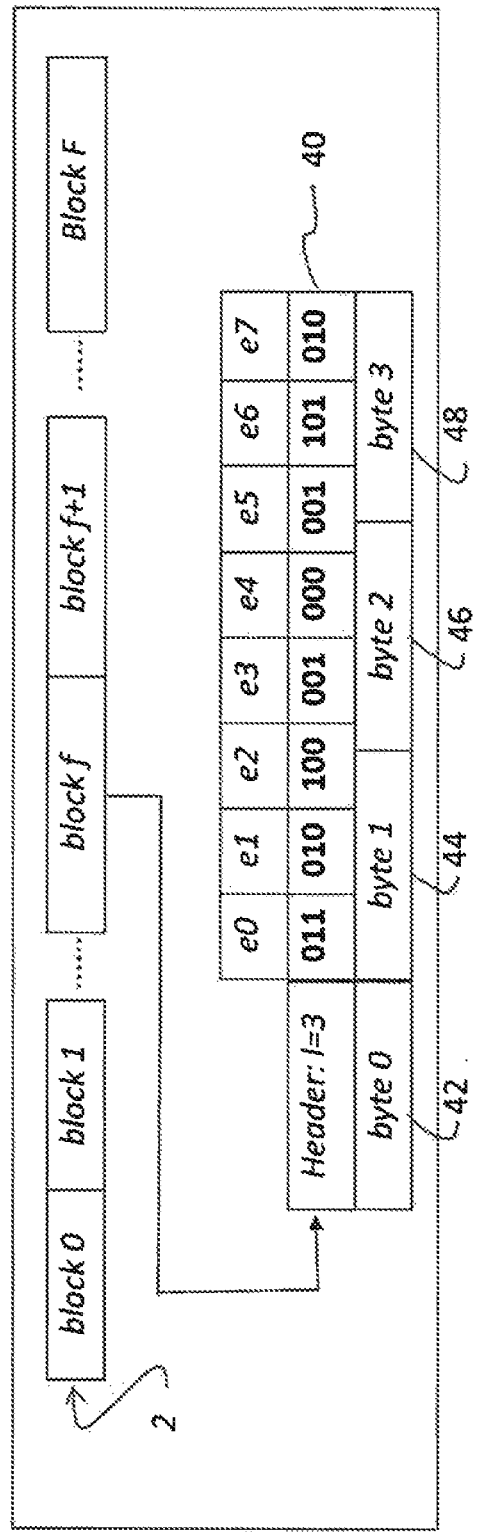
FIG. 3 shows a data structure of an uncompressed posting list block.
Figure 5:
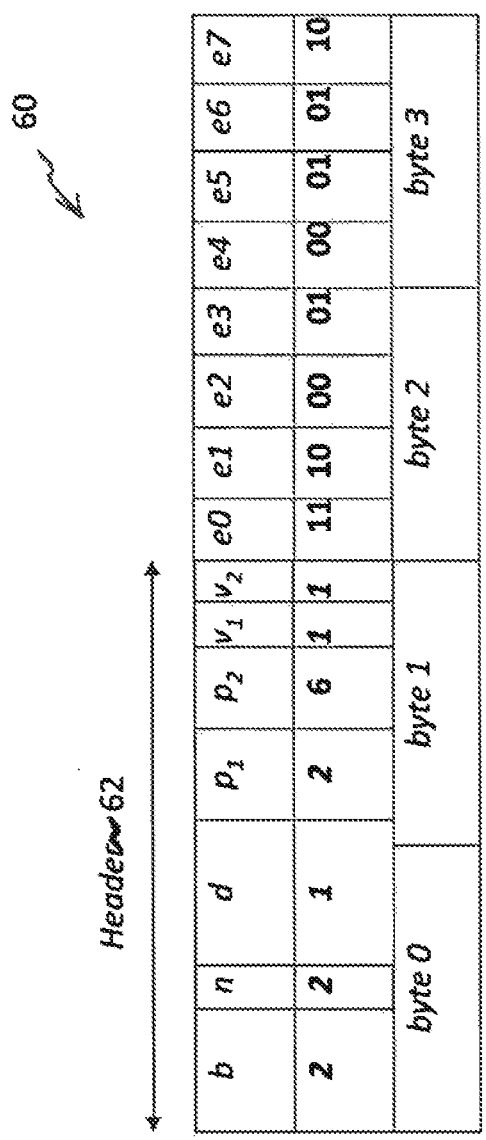
FIG. 5 shows a conventional manner of encoding the posting list block of FIG. 3 with the patch definitions of FIG. 4.
Figure 8:
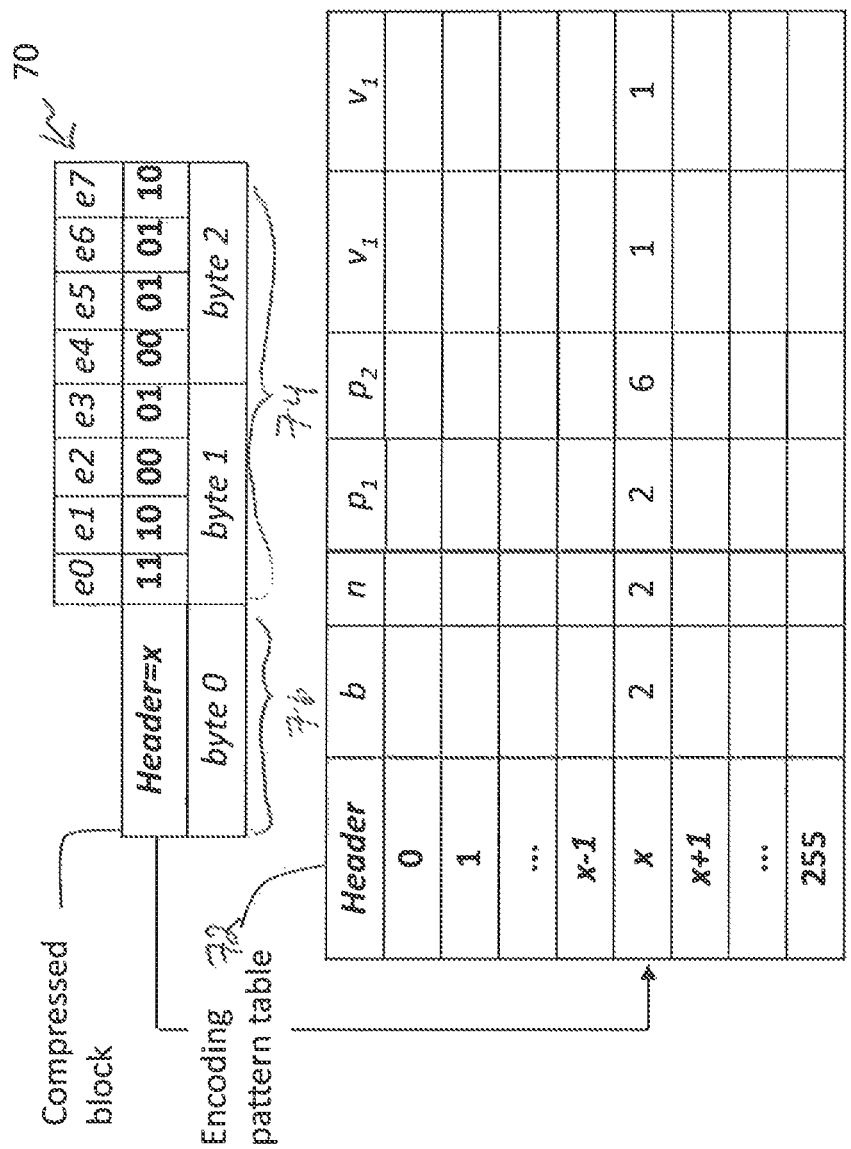
FIG. 8 illustrates using a header to relate a block to an encoding pattern table entry according to a profile of the block.

FIG. 8 illustrates using a header to relate a block to an encoding pattern table entry according to a profile of the block. The block f (see 40 on FIG. 3) has been compressed into a compressed block 70 using the method of indexing references to documents of a database disclosed herein. Its values [3,2,4,1,0,1,5,2], represented as [11,10,100,1,0,1, 101,10] in binary form, have been compressed with M=8 values truncated to b=2 bits, spread over byte 1 and byte 2, which are collectively shown as body 74 on FIG. 8, with n=2 patches of values $v_1=v_2=1$ being found in positions $p_1=2$ and $p_2=6$, in which positions are numbered from 0 to M−1=7. The number of patches, the patch values and the patch positions are not explicitly expressed in the compressed block 70. Instead, a table of descriptors comprising the particular set of values b, n, $p_1 \ldots p_n$, $v_1 \ldots v_n$ defining an encoding pattern for the compressed block 70 is found in a row x of an encoding pattern table 72. A pointer to the row x is placed in a header of the compressed block 70. As shown, the encoding pattern table 72 comprises 256 entries, numbered from 0 to 255. Since this range of values can be coded with eight (8) bits, a pointer to the row x may be stored in the header 76 of the compressed block 70 as an 8-bit pointer, occupying byte 0 of the compressed block 70. The M=8 truncated values of the compressed block 70 occupy b=2 bytes. As will be expressed hereinbelow, variants of the encoding pattern table may comprise various numbers of entries and may relate to headers of different lengths, for example two-byte headers.

Efficiency of decoding a block encoded using the sequence 100 and 120 may depend on various factors, including for example the type of processor used by a database system. One factor that may impact decoding efficiency is the number of patches in a given block. For some processor architectures, it may be desirable to limit the number of patches to two (2) patches per block. Determination of an encoding pattern for a given block may comprise an identification of three (3) largest database references among the M database references of the given block. A value of b sufficient to encode a third largest of the M database references is then selected so that the number n of patches is not greater than two (2). Of course, this process could be adapted so that the value of n is limited to any desired number by identifying n+1 largest database references among the M database references of a block and selecting a value of b sufficient to encode a smallest among those largest of the M database references.

The encoding pattern table 72 may comprise, for example, 256 entries corresponding to 256 encoding patterns, and these entries may be partitioned so that most blocks of a particular application will be compressible.

For example, a first subset of the 256 encoding patterns comprises a plurality of values of b, each encoding pattern of the first subset defining n=0, the first subset therefore comprising one or more flat encoding patterns. Database references of a block corresponding to a flat encoding pattern are not compressed. A second subset of the 256 encoding patterns may then comprise most frequently used encoding patterns. A majority of the encoding patterns of the second subset may then have smaller values of b than a majority of the encoding patterns of the first subset.

In another variant, the 256 encoding patterns may comprise subsets of 24, 120 and 112 encoding patterns. The first 24 encoding patterns are for 24 distinct values of b combined with n=0. The next 120 encoding patterns comprise descriptors b, n=1, $p_1$, $v_1$, each of the 120 encoding patterns having a single patch, one of 5 distinct values of b, one of 3 distinct patch values and one of 8 distinct patch positions. Remaining 112 encoding patterns comprise descriptors b, n=2, $p_1$, $p_2$, 1, 1, each of the 112 encoding patterns having two patch values equal to 1, one of 4 distinct values of b, wherein $p_1$ and $p_2$ form 28 distinct combinations of patch positions for the two patches.

Those of ordinary skill in the art will be able to find other manners of partitioning entries of the encoding pattern table 72 according to the needs of their particular application. For example, another variant may comprise sorting the 256 encoding patterns with positions in increasing order of a sum of b with a length of v. Of course, the value of b is a number of bits and the length of v is also expressed in a number of bits. For all encoding pattern table entries having a given sum, expressed in a number of bits, the encoding patterns may be sorted with positions in increasing values of b—and decreasing of the length of v. Then, determining an encoding pattern for a given block may then comprise searching an encoding pattern by scanning through the sorted encoding patterns starting from a position corresponding to a length of a largest of the M database references of the given block. This manner of searching through the encoding pattern table 72 allows rapidly finding the appropriate encoding pattern for the given block.

Searching for Documents in the Database

Once documents have been stored in the database and once searchable terms extracted from those documents have been used to populate an inverted index according to one of the various embodiments of the method of indexing references to documents of the database described hereinabove, a user may submit to the database one or more search terms in order to retrieve documents that contain the one or more search terms. A search may be independently performed for each search term so the following description is made for a search request comprising a single searchable term. In the event where, for example, a user submits two search terms, the same process will be performed twice, i.e. once for each search term. A response may comprise, for example, a list of documents that contain both of these terms. Alternatively, a response may comprise a list of documents containing either of these search terms, presenting at first most relevant documents that contain both search terms.

Figure 9:
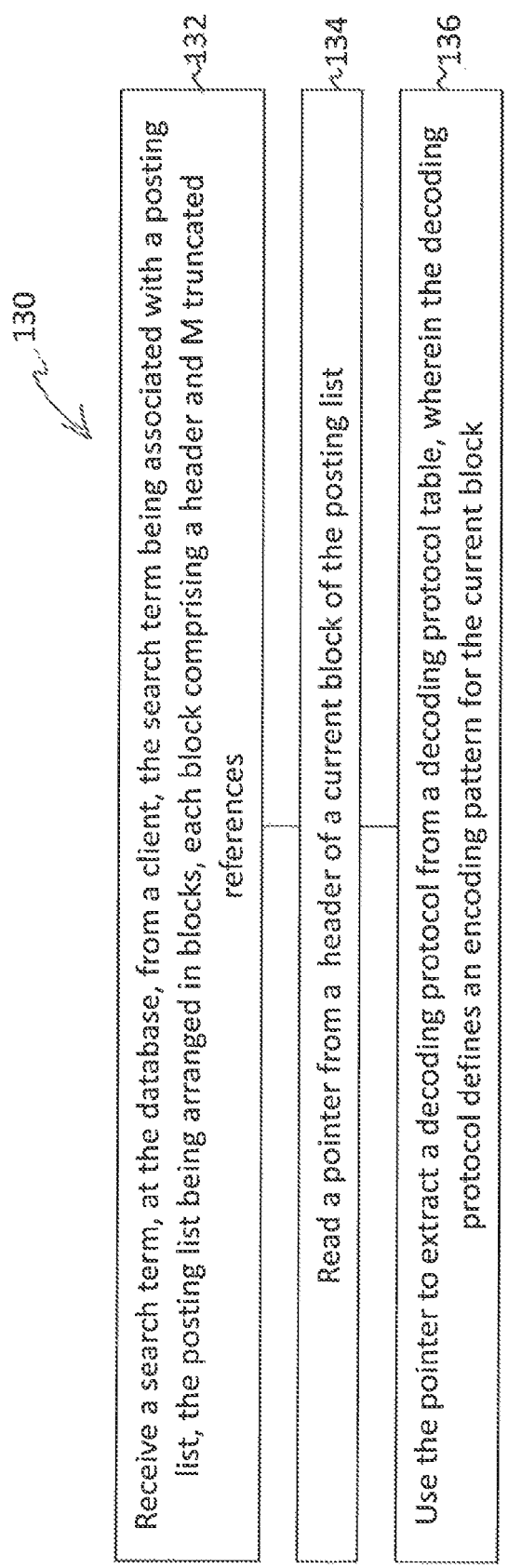
FIG. 9 is a flow chart showing operations of a method of locating documents of a database that contain search terms according to an embodiment.

FIG. 9 is a flow chart showing operations of a method of locating documents of a database that contain search terms according to an embodiment. A sequence 130 comprises a plurality of operations, some of which may be executed in variable order, at least some of the operations possibly being executed concurrently. In the sequence 130, at operation 132, a search term is received at the database, from a client, the search term being associated with a posting list. As expressed hereinabove, the posting list is arranged in blocks, each block comprising a header and M truncated references. A pointer from a header of a current block of the posting list at operation 134. The pointer is used at operation 136 to extract a decoding protocol from a decoding protocol table, wherein the decoding protocol defines an encoding pattern for the current block.

Various practical realizations of the method of locating documents of a database may reflect corresponding variants of the method of indexing references to the documents of the database. Accordingly, in one or more embodiments, the posting list associated with the search term may comprise one or more database references to documents that contain the search term. The number M may be any practical integer value, for example any non-zero positive integer multiple of eight (8). The database may store a plurality of posting lists corresponding to a plurality of searchable terms, the plurality of posting lists forming an inverted index of the database, as introduced in the foregoing descriptions of FIG. 1 and of FIG. 2.

A compressed posting list is formed of a suite of blocks comprising a first header, a first corresponding set of M compressed elements, a second header, a second corresponding set of M compressed elements, and so on. A length of a given block is explicitly or implicitly expressed in the header of the given block. Consequently, a given block needs to be at least partially decoded for determining its length if it is desired to know a position of a header of a next block. When scanning through the posting list, the operation 134 of reading a pointer from a header of a current block of the posting list may therefore comprise, for a first block, reading a starting header of the posting list. The header from which the pointer is read may comprise one or more bytes. A predefined value of a first header byte may indicate whether or not a second header byte is present. Two bytes of a two-byte header then comprise the predefined value and the pointer. This predefined value may for example take the form of a flag indicating the presence of the second header byte. The predefined value may simply be a value within a predefined range for the first header byte.

One or more variants of the posting list may designate monotonously increasing document numbers in the database, in which a first database reference in the posting list is a document number of a first document and a next database reference in the posting list is a delta reference based on a difference between the first document number and a document number of a next document. Expressed differently, the first database reference in the posting list may be construed as a delta reference relative to a $0^{th}$ entry of the posting list, corresponding to a start of the posting list. Thereafter, a suite of successive database references in the posting list may comprise a suite of delta references. A given delta reference may be calculated to be equal to a document number of a given document minus a document number of a preceding document. However, as long as the posting list designates monotonously increasing document numbers in the database, a delta reference calculated as a simple difference between a document number of a given document minus a document number of a preceding document would always be at least equal to one (1), or greater. Knowing this, a variant may calculate a given delta reference to be equal to a document number of a given document minus a document number of a preceding document minus one (1). Of course, a compression method using this method of calculating the delta reference will be associated with a decompression method that also uses this calculation method. This solution saves one (1) bit for every delta reference.

As in the case of the method of indexing references to documents of a database, the encoding pattern of a current block may comprise a base length b of M truncated references of the current block and a number n of patches in the current block. If n>0, the profile also comprises one or more patch values $v_k$ of the current block, wherein k is in a range from 1 to n. If n>0, the profile also comprises one or more patch positions $p_k$ in the current block, wherein $p_k$ is in a range of 0 to M−1. The decoding protocol table may comprise a table of descriptors defining b, n, $p_1$ . . . $p_n$, $v_1$ . . . $v_n$ for a plurality of encoding patterns. Overall, a length of the current block is defined by a length of the header and by the encoding pattern which, in turn, defines a length of compressed elements in the block.

Figure 10:
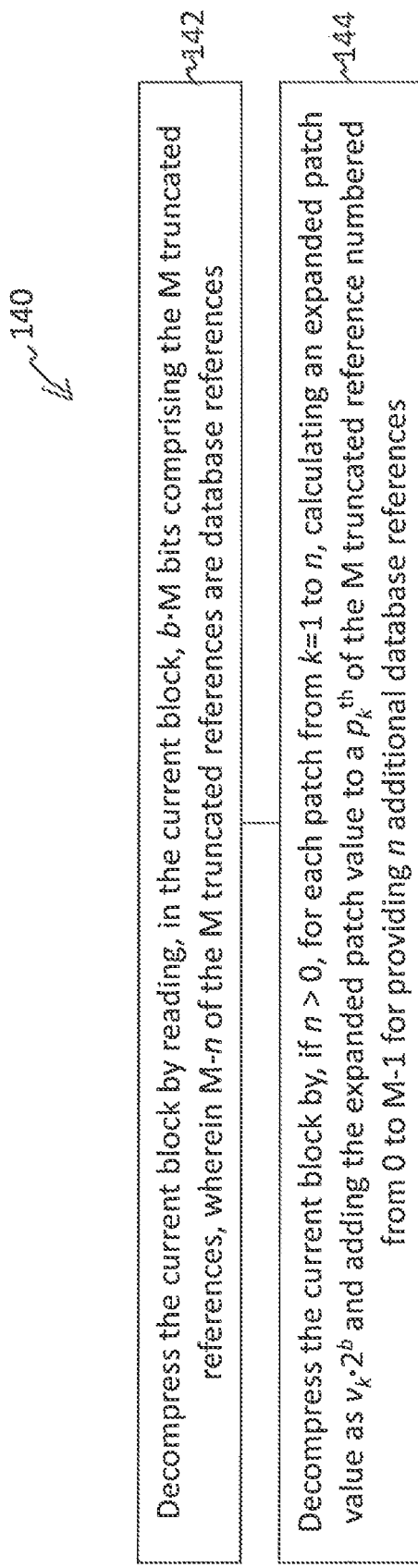
FIG. 10 is a flow chart of operations for decompressing a block according to a first variant of the embodiment of FIG. 9.

The decoding protocol defining an encoding pattern for the current block may be defined in various manners. FIG. 10 is a flow chart of operations for decompressing a block according to a first variant of the embodiment of FIG. 9. A sequence 140 comprises a plurality of operations, some of which may be executed in variable order, at least some of the operations possibly being executed concurrently. In the sequence 140, a current block is decompressed by reading in the current block, at operation 142, b·M bits comprising the M truncated references, wherein M−n of the M truncated references are database references. These M−n database reference either directly point to documents of the database or, if they are delta references, may be directly used to calculate references to documents of the database. If n>0, the current block is further decompressed at operation 144 by calculating, for each patch from k=1 to n, an expanded patch value as $v_k$·2 b and by adding the expanded patch value to a $p_k^{th}$ of the M truncated reference numbered from 0 to M−1 for providing n additional database references. After the current block has been fully decompressed, an overall length of the current block being known, a next pointer may be read from a next header of a next current block of the posting list, the next header immediately following the M truncated references of the current block. The next pointer may then be used to extract a next decoding protocol to decompress the next current block. A complete list of database references to documents of the database that contain the search term may therefore be obtained from reading the complete posting list.

Figure 11:
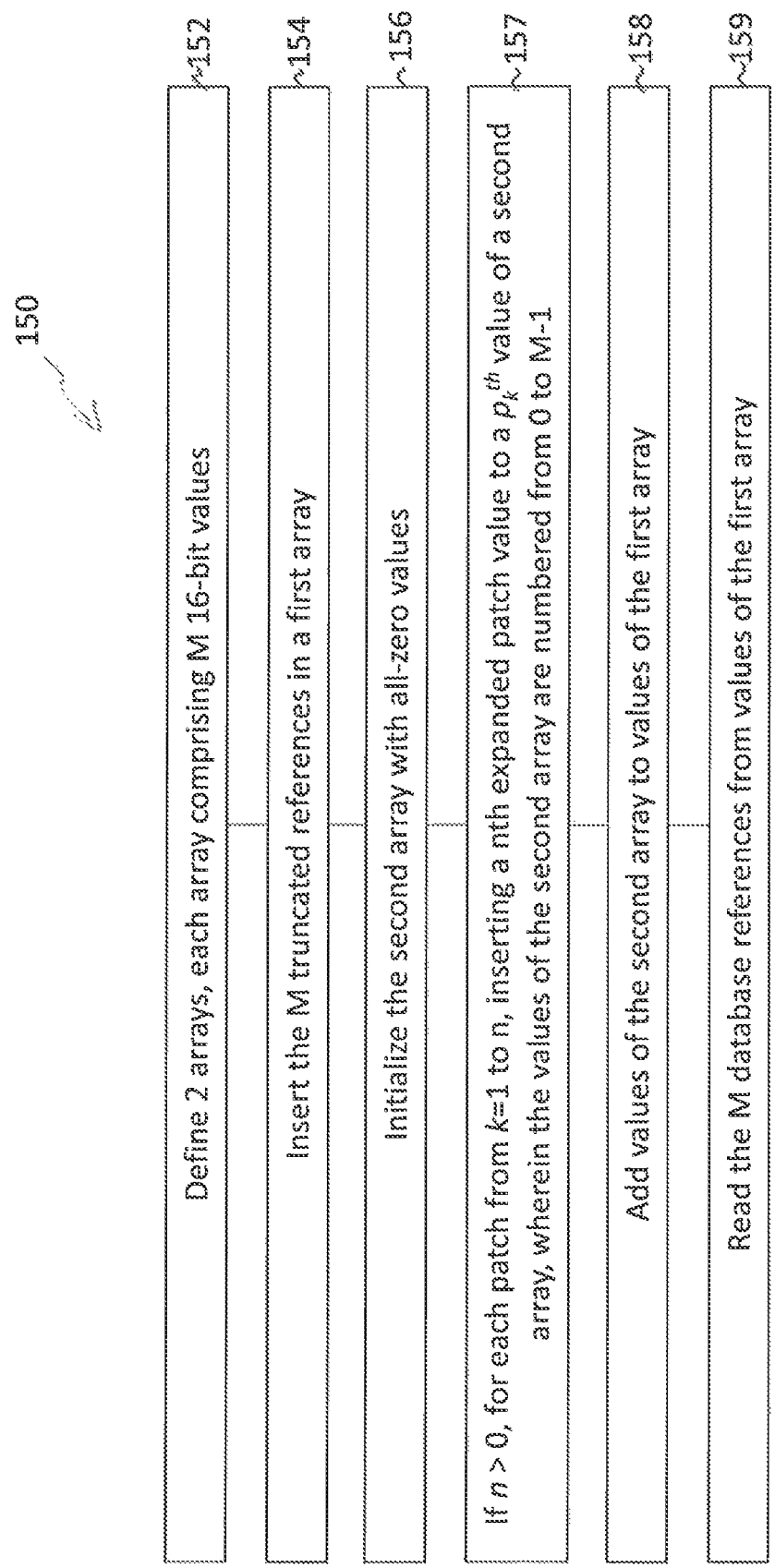
FIG. 11 is a flow chart of operations for decompressing a block according to a second variant of the embodiment of FIG. 9.
Figure 12:
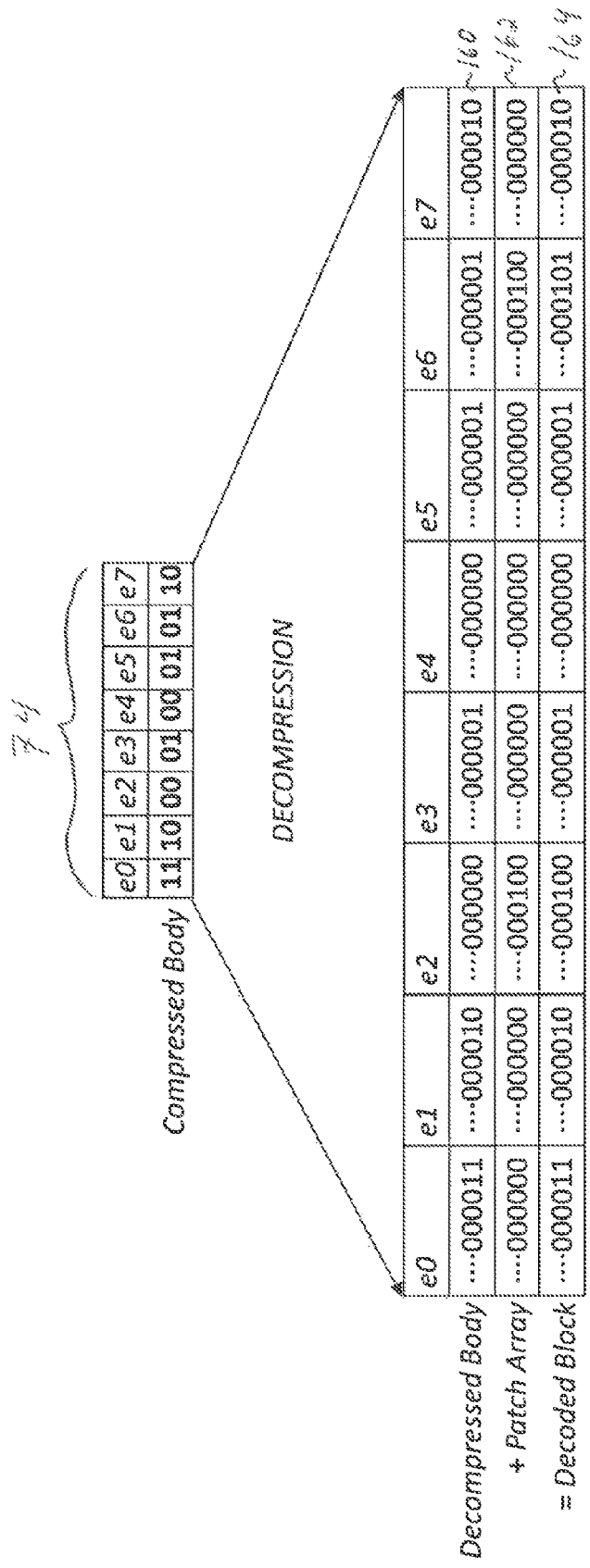
FIG. 12 shows an array-based variant of a method for decompressing a block.

FIG. 11 is a flow chart of operations for decompressing a block according to a second variant of the embodiment of FIG. 9. A sequence 150 comprises a plurality of operations, some of which may be executed in variable order, at least some of the operations possibly being executed concurrently. The operations of the sequence 150 are executed by code instructions designated by the pointer of a current block header. FIG. 12 shows an array-based variant of a method for decompressing a block. FIG. 12 shows the two bytes comprising M=8 values truncated to b=2 bits, the two bytes collectively shown as the body 74 in the above description of FIG. 8. Referring at once to FIGS. 11 and 12, the sequence 150 comprises an operation 152 of defining two (2) arrays 160 and 162, each array comprising M data fields of equal size. The M truncated references are inserted in the M data fields of a first array 160 at operation 154. The M data fields of a second array 162 are initialized with all-zero values at operation 156. At operation 157, if n>0, for each patch from k=1 to n, a $n^{th}$ expanded patch value is inserted to a $p_k^{th}$ data field of the second array 162. It is observed that, for this purpose, the M data fields of the second array 162 are numbered from 0 to M−1, this range corresponding to the range of values of $p_k$. Values of the second array 162 are added to values of the first array 160 at operation 158, providing a decoded block 164. Of course, the values of the first array 160 could be added to values of the second array 162, providing the same result.

The data fields of the first and second arrays 160 and 162 each comprise L bytes, wherein L is a non-zero positive integer number. When a given block carries a database reference greater than $2^{L \cdot 8}-1$, that database reference cannot be placed in a data field of the first or second array 160, 162. In such case, the block has an encoding pattern comprising b>L·8 and n=0. As a non-limiting example where L is equal to two (2) bytes, a database reference greater than 65535 cannot be inserted in the two arrays and the block containing that reference has an encoding pattern with b>16 and n=0.

Figure 13:
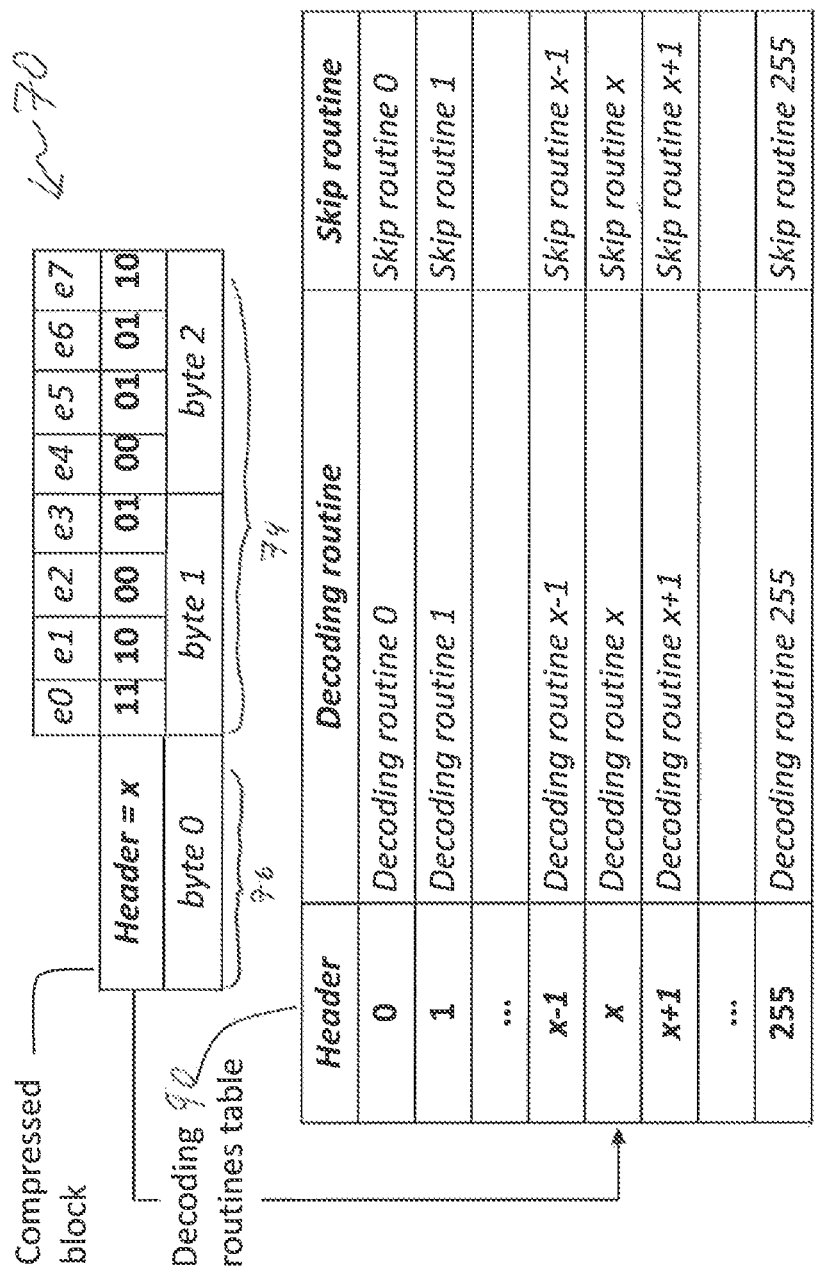
FIG. 13 illustrates using a header to relate a compressed block to a decoding routine table entry according to a profile of the block.

FIG. 13 illustrates using a header to relate a compressed block to a decoding routine table entry according to a profile of the block. The compressed block 70 introduced in the foregoing description of FIG. 8 comprises the header 76 and the two bytes collectively shown as the body 74, the two bytes comprising M=8 values truncated to b=2 bits. A decoding routines table 90 comprises, in a non-limiting embodiment, 256 entries numbered from 0 to 255 and corresponding to the 256 entries of the encoding pattern table 72 of FIG. 8. The header 76 comprises the same 8-bit pointer having a value designating a row x of the decoding routines table 90. In a first variant, the various rows of the decoding routines table 90 may comprise the same or equivalent table of descriptors defining b, n, $p_1 \ldots p_n$, $v_1 \ldots v_n$ as found in the encoding pattern table 72 and the compressed block 70 may be decompressed by modifying the M truncated values by adding values $v_k$ of the n patches to the relevant truncated values, the relevant values being designated by the patch positions $p_k$.

Instead of providing a table of descriptors defining b, n, $p_1 \ldots p_n$, $v_1 \ldots v_n$ for a plurality of encoding patterns, the decoding protocol may use code instructions for decompressing a current block using b, n, $p_1 \ldots p_n$, $v_1 \ldots v_n$. The decoding protocol table may comprise the code instructions or may comprise a table of references to the code instructions. A distinct set of code instructions may be defined for each distinct encoding pattern but some encoding patterns may share a same set of code instructions. Alternatively, a large set of code instructions may comprise code branches for decompressing the any block using values of descriptors b, n, $p_1 \ldots p_n$, $v_1 \ldots v_n$ as branch parameters. In the embodiment as shown on FIG. 13, each row of the decoding routines table 90 comprises a decoding routine and a skip routine. Operations of the decoding routines and skip routines will be described in more details in the description of FIGS. 14, 15, 16 and 17.

Figure 14:
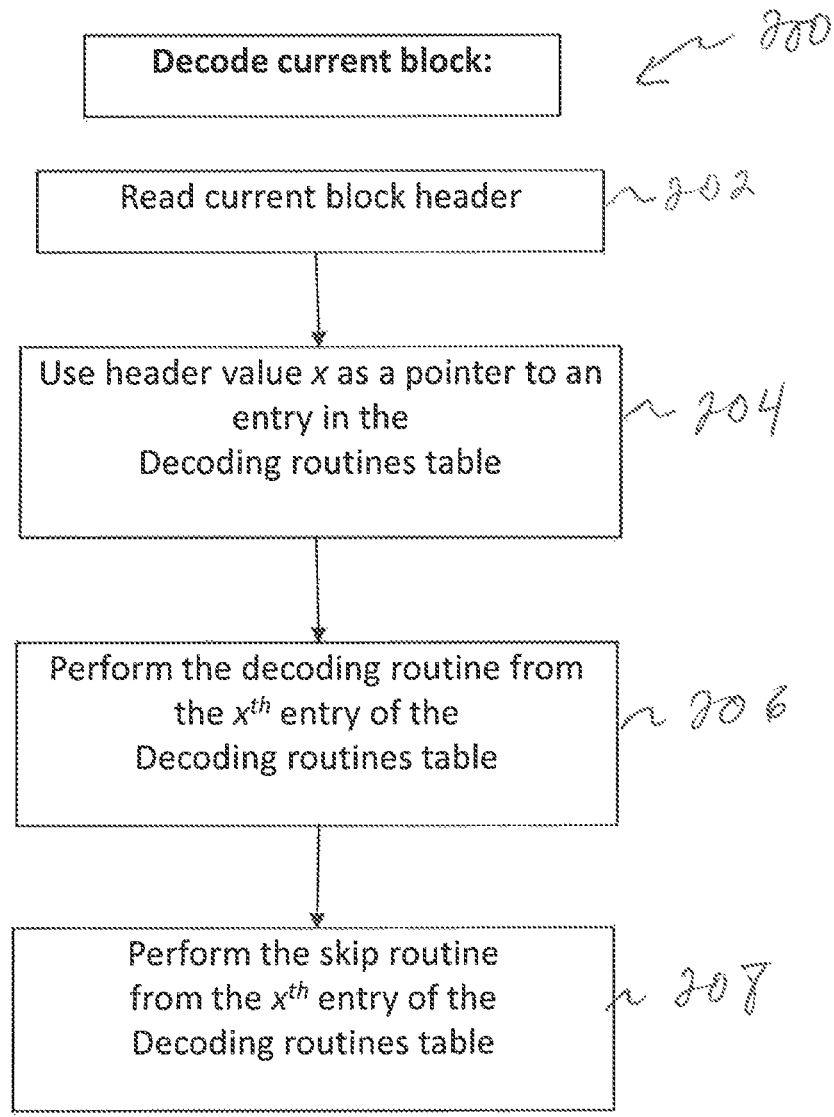
FIG. 14 is sequence of a method for decoding a block.
Figure 15:
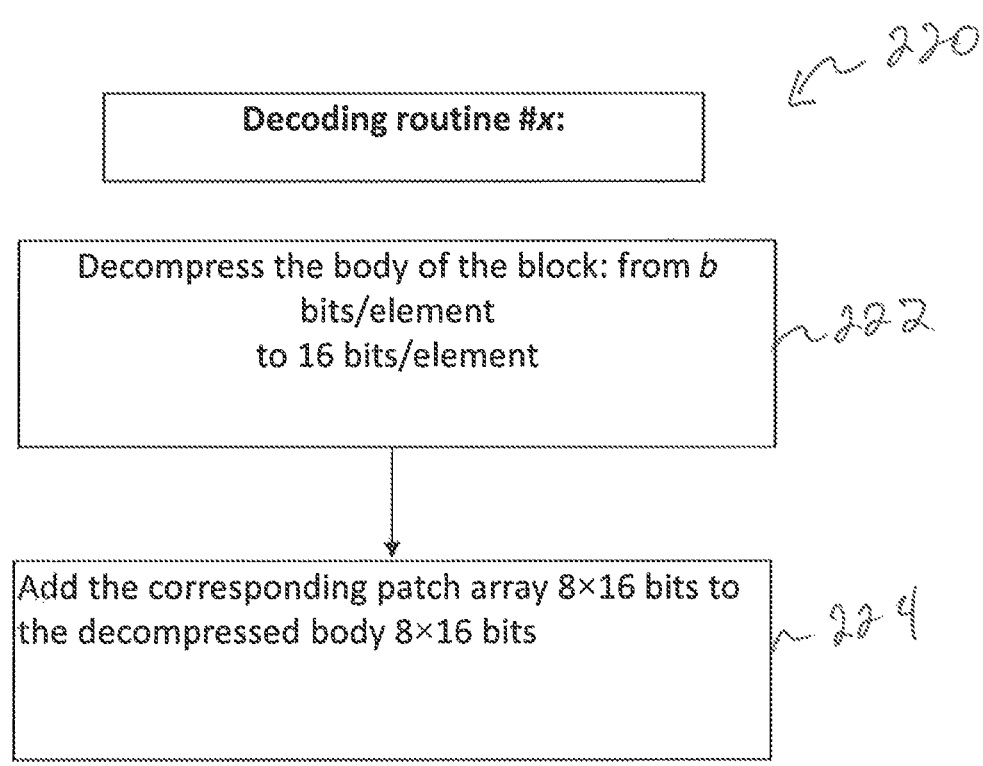
FIG. 15 is a decoding routine used by the sequence of FIG. 14.
Figure 16:
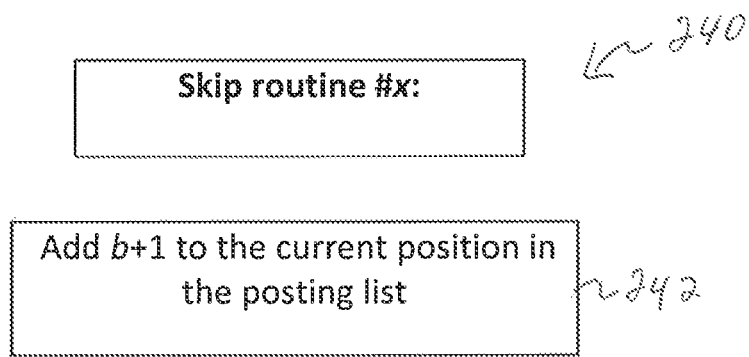
FIG. 16 is a skip routine used by the sequence of FIG. 14.

FIG. 14 is sequence for decoding a block. A sequence 200 comprises reading a header 76 of a current block 70 of a posting list at operation 202. At operation 204, a header value x from the header 76 is used as a pointer to the decoding routines table 90 to obtain a decoding routine x. Operation 206 performs a decoding routine from an $x^{th}$ entry of the decoding routines table 90. FIG. 15 is a decoding routine used by the sequence of FIG. 14. A decoding routine 220 for row x of the decoding routines table 90 comprises instructions 222 for decompressing the body 74 of the current block 70 of M=8 elements from b bits per element to L bytes per elements, for example, two (2) bytes (16 bits) per element. It should be noted that the value of b may differ between various rows of the decoding routines table 90 and, as such, code instructions 222 of the decoding routine 220 for row x may differ from code instructions in decoding routines for other rows of the decoding routines table 90. The decoding routine 220 also comprises instructions 224 for adding a patch array of M=8 times L byte-values (e.g. 16-bit values) to the decompressed body. The instructions 224 for the decoding routine 220 for row x specifically define the patch array for the combination of descriptors comprising b, n, $p_1 \ldots p_n$, $v_1 \ldots v_n \ldots$ reflecting the values for the corresponding row x of the encoding pattern table 72 of FIG. 8. As such, code instructions 224 of the decoding routine 220 for row x may differ from code instructions in decoding routines for other rows of the decoding routines table 90. The sequence 200 continues with operation 208 of performing a skip routine decoding routine from the $x^{th}$ entry of the decoding routines table 90. FIG. 16 is a skip routine used by the sequence of FIG. 14. A skip routine 240 for row x of the decoding routines table 90 comprises instructions 242 for calculating a position of a next block of the posting list, following the current block 70. A length of the header 76 being known, equal to one (1) byte in the example of FIG. 13, and a length of the body 74 being known, equal to b bytes, a position of a new block 70 in the posting list is calculated by the code instructions 242 so that the sequence 200 may then decompress the next block 70.

Figure 17:
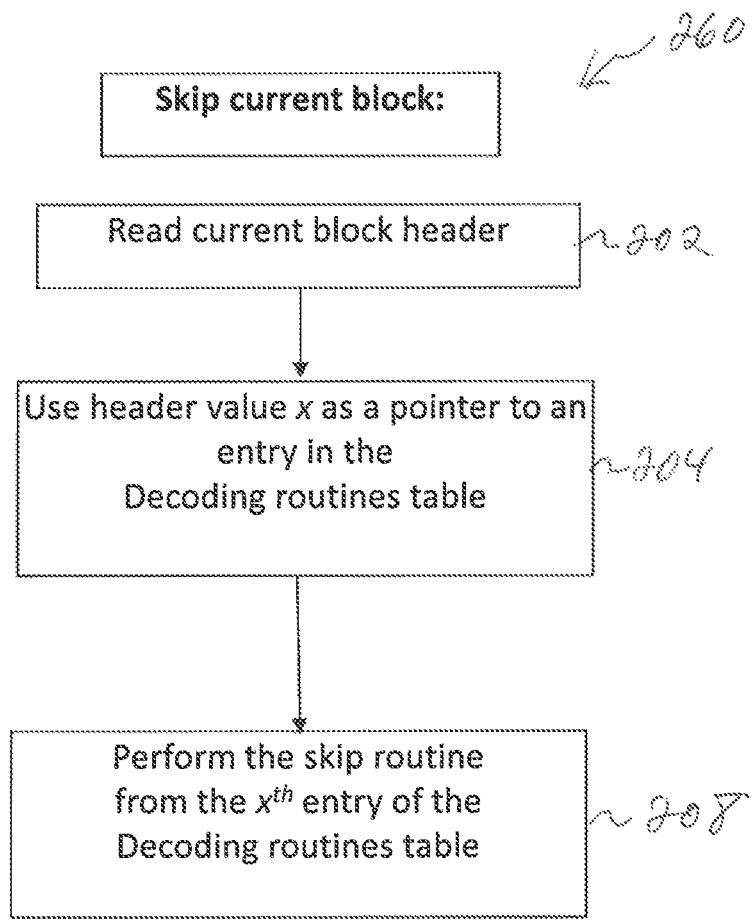
FIG. 17 is a sequence for skipping a current block.

FIG. 17 is a sequence for skipping a current block. A sequence 260 may be used when a current block 70 does not need to be decompressed and it is desired to reach a next block 70 that needs to be decompressed using the sequence 200. The sequence 260 is similar to the sequence 200 of FIG. 14 and comprises the same operations 202, 204 and 208, without the need to execute the decoding specified in operation 206. The sequence 260 may be particularly useful when the posting list is part of an inverted index in the form of a single vector, as illustrated in FIG. 2. The sequence 260 may be executed as many times as required to find the beginning of a given posting list within the inverted index of FIG. 2.

Figure 18:
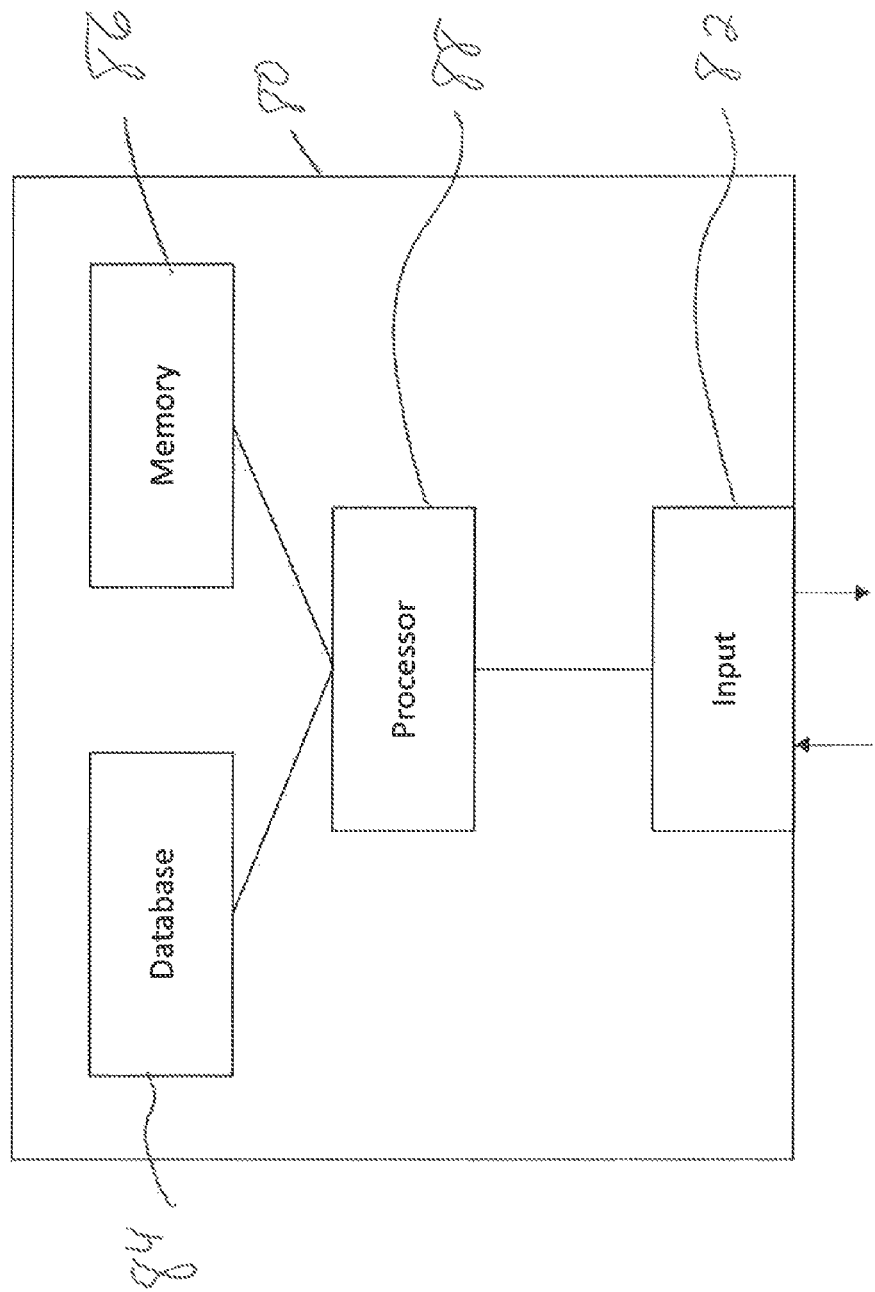
FIG. 18 is a block diagram of a database system according to an embodiment.

FIG. 18 is a block diagram of a database system according to an embodiment. A database system 80 comprises an interface including an input 82, a database 84, a memory 86 and a processor 88, the processor 88 being operably connected to the input 82, to the database 84 and to the memory 86. In one embodiment of the database system 80, the input 82 receives a document from a server. The processor 88 fetches the document from the input 82 for storing it in the database 84. The memory 86 contains an inverted index comprising a plurality of posting lists and further contains an encoding pattern table. The processor extracts 88 a searchable term from the document, in which the searchable term is associated in the memory 86 with a posting list. The processor 88 structures, in the memory 86, the posting list into blocks. According to this structure, each block comprises M database references. For each block, the processor 88 determines an encoding pattern based on values of the M database references, locates in the memory 86 an encoding pattern table entry corresponding to the encoding pattern and stores, in the memory 86, the pointer corresponding to the located encoding pattern table entry in a header for the block. The processor 88 may repeat this process for several searchable terms or for all searchable terms obtained from the document.

In the same or another embodiment of the database system 80, the memory 86 contains a decoding protocol table and an inverted index comprising a plurality of posting lists, each posting list being arranged in blocks, each block comprising a header and M truncated references. The input 82 receives a search term from a client. The processor 88 selects in the memory 86 a posting list associated with the search term. The processor 88 reads a pointer from a header of a current block of the posting list. The processor 88 then uses the pointer to extract a decoding protocol from the decoding protocol table, wherein the decoding protocol defines an encoding pattern for the current block.

Various embodiments of the database system 80 may further be capable of executing the various operations of the methods illustrated in one or more of FIGS. 6, 7, 9, 10, and 11, with the data structures shown in one or more of FIGS. 1, 2, 3, 4, 5, 8, 12 and 13, optionally using the sequences and routines of one or more of FIGS. 14, 15, 16 and 17. The database system 80 may be configured as a single hardware node or may be implemented as a plurality of operably connected hardware nodes that may be co-located or located on various premises, connected nodes operating in load-sharing mode, in redundancy mode or in both load-sharing and redundancy modes. The database system 80 may comprise several other hardware or software components, which are not shown for clarity purposes, including power supplies, busses, communication interfaces, user interfaces, and other elements as are well known to those of ordinary skill in the art.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A method for indexing references to documents of a database, the method comprising:
receiving a document, at the database, from a server;
storing the document in the database;
extracting a searchable term from the document, the searchable term being associated with a posting list, the posting list comprising a plurality of references to documents;
dividing the posting list into a plurality of blocks, each block comprising M number of references to documents of the plurality of references to documents, M being an integer;
for each block of the plurality of blocks, compressing the block into a compressed block of a plurality of compressed blocks by:
determining an encoding pattern for the block based on values of each one of the respective M number of references to documents;
encoding content of the block based on the encoding pattern;
locating an encoding pattern table entry corresponding to the encoding pattern; and
inserting a pointer corresponding to the located encoding pattern table entry in a header of the compressed block,
the plurality of compressed blocks forming a compressed posting list.

2. The method of claim 1, wherein M is a non-zero positive integer multiple of 8.

3. The method of claim 1, wherein storing the document in the database comprises an element selected from adding the document to the database, updating the document in the database, overwriting the document in the database and modifying the document in the database.

4. The method of claim 1, wherein documents are stored in the database independently from searchable terms that they contain.

5. The method of claim 1, wherein a plurality of posting lists correspond to a plurality of searchable terms, the plurality of posting lists forming an inverted index of the database.

6. The method of claim 5, wherein the inverted index forms a two-dimensional table in which the plurality of searchable terms are in a first dimension and posting lists corresponding to each of the plurality of searchable terms are in a second dimension.

7. The method of claim 5, wherein the inverted index forms a continuous vector in which a first given searchable term is followed by a corresponding posting list and wherein the posting list corresponding to the first given searchable term is followed by a next searchable term.

8. The method of claim 1, wherein the header comprises a single byte.

9. The method of claim 1, wherein:
the header comprises two bytes;
a predefined value of a first header byte indicates presence of a second header byte; and
the two bytes of a two-byte header comprise the predefined value and the pointer corresponding to the located encoding pattern table entry.

10. The method of claim 9, wherein the predefined value comprises one of a range of predefined values and a flag.

11. The method of claim 1, wherein the posting list designates monotonously increasing document numbers in the database.

12. The method of claim 11, wherein:
a first reference to document in the posting list is a document number of a first document; and
a next reference to document in the posting list is a delta reference based on a difference between the first document number and a document number of a next document.

13. The method of claim 12, wherein a suite of successive references to documents in the posting list comprises a suite of delta references.

14. The method of claim 13, wherein a given delta reference is equal to a document number of a given document minus a document number of a preceding document.

15. The method of claim 14, wherein a given delta reference is equal to a document number of a given document minus a document number of a preceding document minus 1.

16. The method of claim 1, comprising inserting in the compressed block a sequence of M number of truncated references to documents, each truncated reference to document comprising b least significant bits of a corresponding one of the M number of references to documents.

17. A database system for indexing references to documents, the system comprising:
 an input for receiving a document from a server;
 a database for storing the document;
 a memory containing an inverted index comprising a plurality of posting lists and containing an encoding pattern table; and
 a processor, operably connected to the input, to the database and to the memory, for:
  extracting a searchable term from the document, the searchable term being associated in the memory with a posting list, the posting list comprising a plurality of references to documents;
  structuring, in the memory, the posting list into a plurality of blocks, each block comprising M number of references to documents of the plurality of references to documents, M being an integer;
  for each block of the plurality of blocks, compressing the block into a compressed block of a plurality of compressed blocks by:
   determining an encoding pattern for the block based on values of each one of the respective M number of references to documents;
   encoding content of the block based on the encoding pattern;
   locating an encoding pattern table entry corresponding to the encoding pattern; and
   storing, in the memory, a pointer corresponding to the located encoding pattern table entry in a header of the compressed block
  the plurality of compressed blocks forming, in the memory, a compressed posting list.

\* \* \* \* \*